United States Patent
May et al.

[11] Patent Number: 5,570,443
[45] Date of Patent: Oct. 29, 1996

[54] COMBINED BEAM WAVEGUIDE AND METAL CABLE PLUG CONNECTOR

[75] Inventors: Guntram May, Altdorf; Jürgen Hitz, Oelsnitz, both of Germany

[73] Assignee: Framatome Connectors International, Paris, France

[21] Appl. No.: 421,268

[22] Filed: Apr. 13, 1995

[30] Foreign Application Priority Data

Apr. 13, 1994 [DE] Germany .......................... 44 12 571.2

[51] Int. Cl.$^6$ .................................................. G02B 6/36
[52] U.S. Cl. ............................ 385/75; 439/468; 385/136; 385/86
[58] Field of Search ..................... 439/466, 468, 439/473; 385/75, 53, 56, 66, 67, 69, 76, 77, 84, 86, 87, 101, 134, 136, 137, 139, 147

[56] References Cited

U.S. PATENT DOCUMENTS

| | | | |
|---|---|---|---|
| 4,325,599 | 4/1982 | Feldman | 439/468 |
| 4,611,887 | 9/1986 | Glover et al. | 385/71 |
| 4,657,340 | 4/1987 | Tanaka et al. | 385/59 |
| 4,767,181 | 8/1988 | McEowen | 385/75 |
| 4,786,136 | 11/1988 | Cannon | 385/75 |
| 4,869,686 | 9/1989 | Michaels et al. | 439/468 |
| 5,073,044 | 12/1991 | Egner et al. | 385/86 |
| 5,185,839 | 2/1993 | Newell et al. | 385/139 |
| 5,235,665 | 8/1993 | Marchesi et al. | 385/135 |

FOREIGN PATENT DOCUMENTS 3129828  5/1989  Germany .

*Primary Examiner*—John Ngo
*Attorney, Agent, or Firm*—Pollock, Vande Sande & Priddy

[57] ABSTRACT

Combined beam waveguide and metal cable plug connector

A combined beam waveguide and metal cable plug connector with an angled cable outlet, comprising a housing (1) in which beam waveguide plugs (4) and flat contact springs are disposed on the plug side in contact chambers (2, 3) provided for the purpose while an outlet aperture for the cables (5, 21) is provided at the rear. The opening for the cables comprises a channel (6), the base of which is bent at an angle of 90° maximum to the plug axis and which is open towards the back of the plug connector. The metal cables (21) are taken out of the housing (1) in one or more layers on the channel base (6). A snap cap (7) closes the channel (6) at the rear and has lateral ducts (8) in which beam waveguide cables (5) are accommodated, the ducts (8) ensuring that the beam waveguide cables (5) are deflected with a radius which is not damaging to the beam waveguide cables.

11 Claims, 4 Drawing Sheets

COMBINED BEAM WAVEGUIDE AND METAL CABLE PLUG CONNECTOR

FIELD OF THE INVENTION

This invention relates to a combined beam waveguide and metal cable plug connector.

BACKGROUND OF THE INVENTION

Plug connectors of this kind can be used wherever optical signal transmission and an electrical power supply are involved simultaneously. For example, in modern motor vehicles, the data transmission is by way of beam waveguides and the electrical power is fed to the loads via metal cables.

The metal cables and the beam waveguide cables are taken out of the plug housing jointly at the back of the plug connector. In such cases, the electrical cable cores and the beam waveguide cables are frequently combined into a bunch and possibly surrounded by a common protective covering. In such cases, there is a risk that, despite their sensitivity to kinking and bending with too small a radius of curvature, the beam waveguide cables may undergo the same treatment as the metal cables, which are insensitive in this respect. A permanent or even just temporary curvature of the beam waveguide cables with too small a radius of curvature can permanently damage the beam waveguide fibers and result in excessive attenuation. This is particularly important if a 90° cable outlet is required.

SUMMARY OF THE INVENTION

The object of this invention is to so improve a combined beam waveguide and metal cable plug connector as to enable the beam waveguide cables together with the metal cables to be taken in defined manner laterally out of the plug housing with a high degree of relief from tension, while ensuring that the beam waveguide cables are so treated as to avoid any bends which cause attenuation. In addition, the beam waveguide plugs are to be axially movable in order to ensure permanent contact with the opto-electronic components despite tolerances.

By means of the snap cap according to the invention, the beam waveguide cables have optimal guidance over the entire area of their change of direction within the plug housing, so as reliably to avoid any bends.

The metal cables and beam waveguide cables are combined at the outlet of the plug connector, from where the cable can be run on with substantially no appreciable abrupt changes of direction.

BRIEF DESCRIPTION OF THE DRAWINGS

In order that the invention may be more clearly understood, reference will now be made to one exemplified embodiment and the attached drawings.

DETAILED DESCRIPTION

Figure 1:
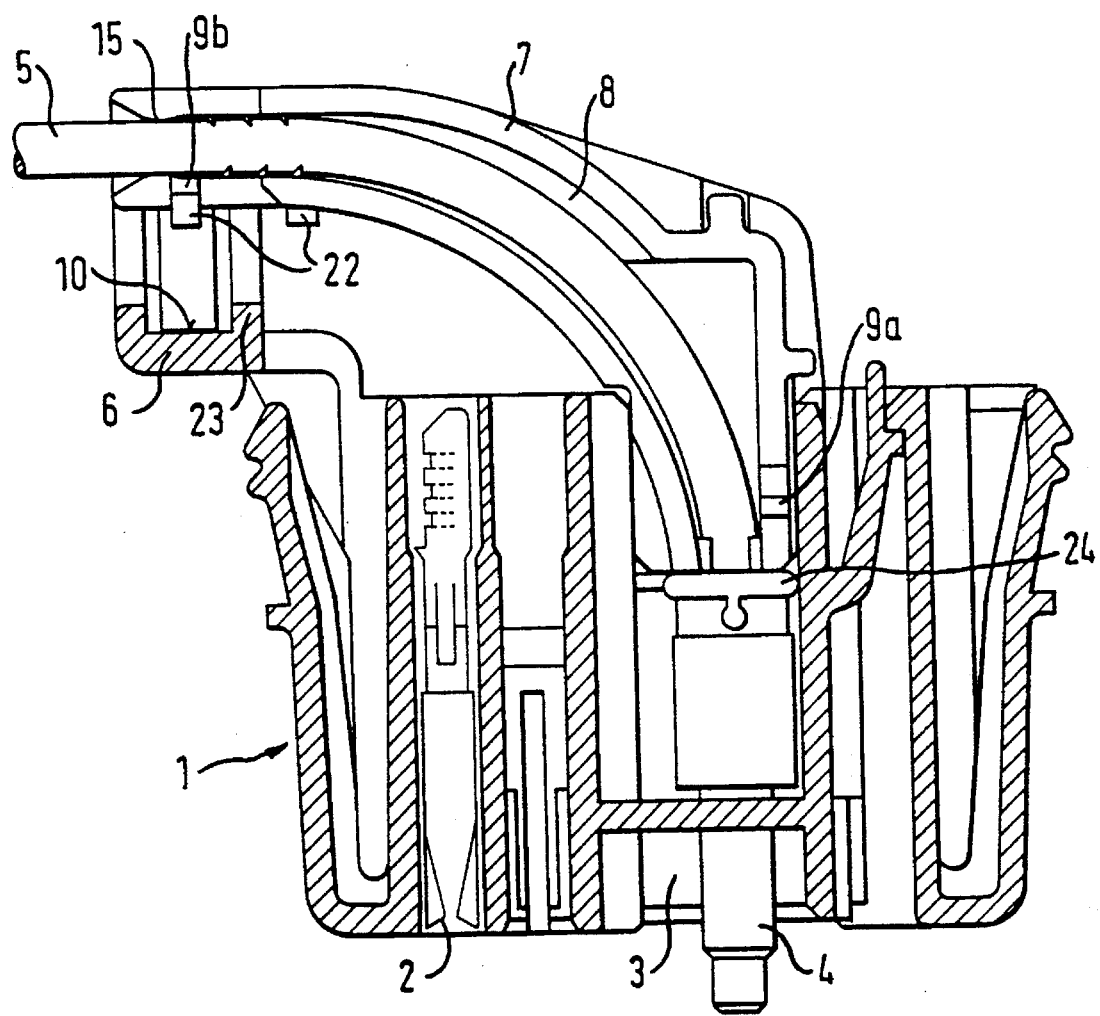
FIG. 1 is a cross-section through a combined beam waveguide and metal cable plug connector according to the invention.

FIG. 1 is a cross-section of a plug connector housing 1 having contact chambers to receive flat spring contacts (not shown) and a socket 3 for the beam waveguide plugs 4 of a beam waveguide cable 5. At its connection side, the plug connector housing 1 has a U-shaped channel 6, through which the cables emerge from the plug housing. On the connection side of the plug connector housing 1, the U-shaped channel is closed by a snap cap 7. Cap 7 covers the rear zone of the housing from the beam waveguide cable socket as far as the output end of the U-shaped channel 6. The cap 7 has ducts 8 into which the beam waveguide cables 5 are inserted. The duct 8 is so shaped that the beam waveguide cable nowhere experiences a curvature of a radius below the minimum permissible radius of curvature for beam waveguide cables. This obviates any damage to the beam waveguide cable. Also, the duct 8 is so designed that an axial movement is possible damped by a silicone spring of the plug 4.

The cap 7 is releasably secured by the engagement of detent lugs 9a, 9b in matching grooves in the housing 1. The cap 7 also shuts off the rear of the U-shaped channel 6 so that the metal cables (not shown) taken out of the plug connector housing 1 between the base 10 of the channel 6 and the underside of the cap 7 are pressed by webs 23, 24 at the base 18 and at the underside of the cap 7 in serpentine shape, thus ensuring that the metal cable is relieved of any appreciable tension. A cable bushing can follow this and prevent any bending of the bunch of cables where they are taken out of the housing 1 (not shown).

Figure 2:
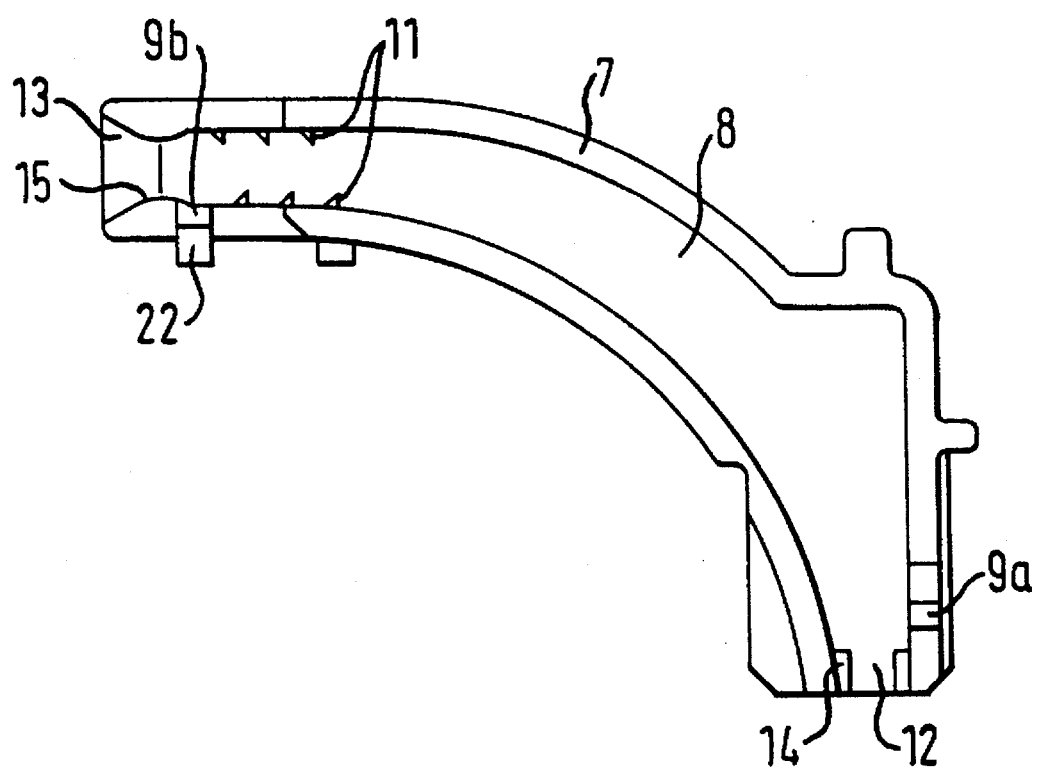
FIG. 2 shows the snap cap according to FIG. 1.

FIG. 2 shows the cap 7 with one of its ducts 8 and the detent lugs 9a, 9b. Relatively sharp-edged pins 11 are provided on the output side, in a staggered arrangement on the inner walls of the duct 8, and these pins engage in the sheath of the cable inserted in the duct 8 in order thus to relieve the cable of tension without damaging it. Shoulders 14 are also provided on the duct inlet 12 in order to clip the beam waveguide cable in on assembly. Radiused thickenings are provided at the duct outlet 13 and act as antibending means.

Figure 3:
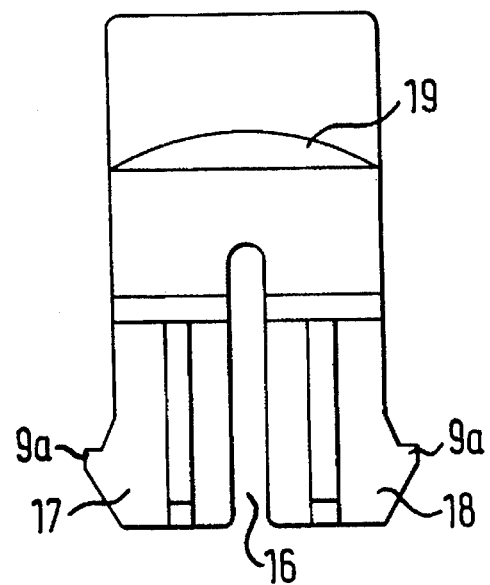
FIG. 3 is a front elevation of the cap.

FIG. 3 is a right-hand side elevation of the plug connector shown in FIG. 2. It will be seen that a slot 16 divides the right-hand end of the cap in FIG. 2 into two limbs 17, 18, on the outer ends of which each of the detent lugs 9a are disposed. The limbs thus become resilient so that the detent lugs can engage in correspondingly narrow grooves in the housing 1 and snap into corresponding seatings.

The radiused shoulder 19 serves as a handle for pressing in the cap 7 and stabilizes the spring action of the limbs 17, 18.

Figure 4:
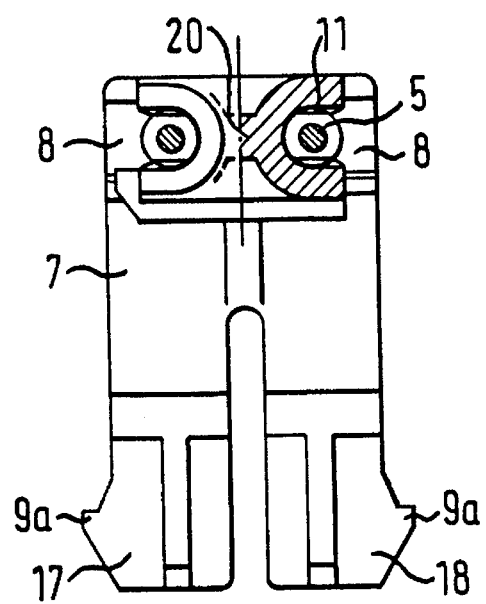
FIG. 4 is a cap viewed from the cable outlet side.

FIG. 4 is an end plan view of the cap 7, again showing limbs 17, 18, together with the detent lugs 9a and the ducts 8 with beam waveguide cables 5 clamped between shoulders 14 by means of the pins 11. The ducts 8 are U-shaped, with the two openings respectively, pointing to the right and left, the bottom zones of the two ducts 8 being connected by a web 20.

Figure 5:
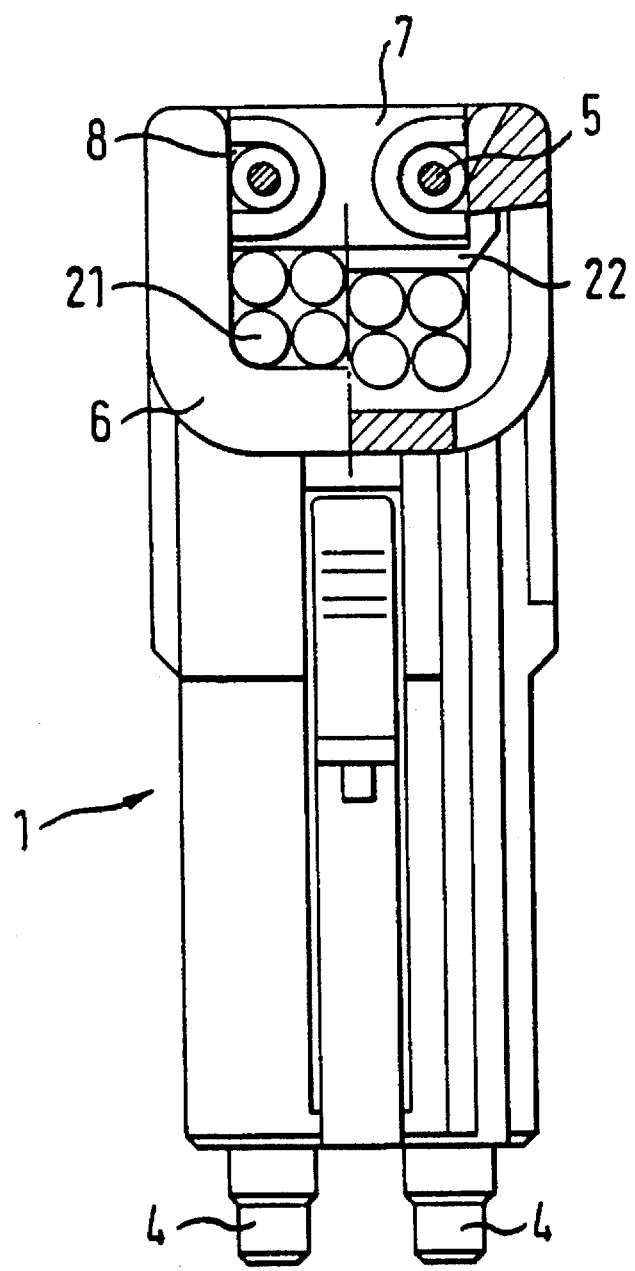
FIG. 5 shows the outlet end of the plug connector housing with the cap engaged, from the cable outlet side.

FIG. 5 is a partial section and end elevation of the plug connector housing 1 with the cap 7 fitted. The U-shaped channel 6 is shown partially in cross-section, and contains eight metal cables 21 in two layers of four cables each on the base of the U-shaped channel 6. The channel 6 is closed by the cap 7, which at the same time guides the metal cables 21 by its transverse webs 22 into the recess between transverse web 22 and the base of the channel 6 in serpentine fashion, so that the metal cables are relieved of tension. The ducts 8 in the cap 7 each contain a beam waveguide cable 5. The ducts 8 are closed by the side walls of the U-shaped channel 6. The beam waveguide plugs 4 are provided at the bottom end of the housing. The beam waveguide cables 5 and the metal cables 21 can be combined at the output side of the plug connector housing to form a composite cable and be interconnected by a common cover. An anti-bend bushing (not shown) can also be fitted in known manner at the end face of the U-shaped channel 6 and the cap 7.

The plug connector housing according to the invention combines two completely different tension relief means adapted to the specific requirements of the different cables, and such means are both non-damaging and efficient, in the minimum space, any bending or curving of the beam waveguide cable with too small a radius of curvature, and the resulting attenuation losses, being reliably avoided. Advantageously, the cap is so constructed that the beam waveguide plug can move axially to allow for any tolerances. This ensures that the beam waveguide plugs always bear with light pressure on the opto-electronic components, so that low attenuation is achieved. The beam waveguide cable additionally has anti-bending means in the cap. It is a simple matter to fit the cap, and this can be done without difficulty even in restricted spaces. If the flat spring contacts have to be handled, it is possible to separate the beam waveguide cables 5 together with the cap 7 without it being necessary to remove the cables from the cap. This also reduces any risk of damage in the event of repair or installation work. The general design of the plug connector housing is robust and reliable.

We claim:

1. A combined beam waveguide and metal cable plug connector with an angled cable outlet, comprising:
   (a) a housing;
   (b) beam waveguide plugs and flat contact springs disposed on a plug side of said housing in contact chambers, and an outlet opening for cables at a rear of said housing;
   (c) said opening for said cables comprising a channel having a base which is bent at an angle equal to or less than 90° to a plug axis and which is open toward a back of the plug connector;
   (d) wherein said cables pass out of said housing through a U-shaped channel in said housing;
   (e) a snap cap closing said channel at the rear and having lateral ducts in which beam waveguide cables are accommodated, said ducts ensuring that said cables are deflected with a radius which is non-damaging to said cables.

2. A combined beam waveguide and metal cable plug connector according to claim 1, wherein said cap has substantially quadrant-shaped ducts which receive said beam waveguide cables directly at the back of the beam waveguide plug, said ducts being configured to allow axial movement of said beam waveguide plug.

3. A combined beach waveguide and metal cable plug connector according to claim 1, wherein said cap comprises, parallel to its plug-in direction, a slot which divides an end of said cap facing the plugs into two limbs, at least one detent lug adapted to engage in corresponding grooves in the housing being disposed on each of the outsides of said limbs.

4. A combined beam waveguide and metal cable plug connector according to claim 1, wherein staggered shape-edged retaining pins are provided at the duct inner walls in the region of the outlet end of said beam waveguide cable ducts for engagement in a beam waveguide cable sheath, and a radiused constriction is provided as anti-bend means.

5. A combined beam waveguide and metal cable plug connector according to claim 1, wherein the ducts each have a U-shaped cross-section with opening tapers in places to clamp said beam waveguide cables.

6. A combined beam waveguide and metal cable plug connector according to claim 1, wherein the cable outlet end of said cap has a transverse web by means of which said cables are pressed onto the base of the U-shaped channel.

7. A combined beam waveguide and metal cable plug connector according to claim 1, including a common anti-bend bushing for said beam waveguide cables and said cables at the outlet of said channel and said cap.

8. A combined beam waveguide and metal cable plug connector according to claim 1, wherein the connection between said housing and said cap is a snap-in connection situated substantially on an axis of action of the force of the tension relieving means and of said beam waveguide plugs.

9. A combined beam waveguide and metal cable plug connector according to claim 3, wherein said channel is a resilient element in the region of the tension relief elements, and said limbs are resilient in the region of the beam waveguide plug.

10. A combined beam waveguide and metal cable plug connector according to claim 1, wherein said cap has resilient shoulders in the region of abutment of said beam waveguide plug in order to clip in the beamwave guide cable upon assembly.

11. A combined beam waveguide and metal cable plug connector according to claim 1, wherein said channel is U-shaped and limbs of said channel close the ducts in said cap after said cap is fitted.

* * * * *